United States Patent
vom Stein et al.

(10) Patent No.: US 7,415,953 B2
(45) Date of Patent: Aug. 26, 2008

(54) OIL SEPARATOR

(75) Inventors: Hans-Joachim vom Stein, Odenthal (DE); Marcel Op de Laak, Freiburg (DE)

(73) Assignee: AB SKF, Gothenburg (SE)

( * ) Notice: Subject to any disclaimer, the term of this patent is extended or adjusted under 35 U.S.C. 154(b) by 0 days.

(21) Appl. No.: 11/068,840

(22) Filed: Mar. 2, 2005

(65) Prior Publication Data

US 2006/0054123 A1    Mar. 16, 2006

(30) Foreign Application Priority Data

Mar. 2, 2004    (DE)    ........... 10 2004 010 583

(51) Int. Cl.
*F01M 9/10*    (2006.01)
(52) U.S. Cl. ........................ 123/90.38; 96/189
(58) Field of Classification Search ............. 123/90.38, 123/41.86; 55/215, 385; 96/189
See application file for complete search history.

(56) References Cited

U.S. PATENT DOCUMENTS 4,450,375 A * 5/1984 Siegal ................. 310/331
4,528,969 A    7/1985 Senga
5,957,100 A * 9/1999 Frohwerk et al. ........ 123/90.38
2002/0170775 A1    11/2002 Stein et al.

FOREIGN PATENT DOCUMENTS

| DE | 39 10 559 A1 | 10/1990 |
| DE | 198 20 384 A1 | 11/1999 |
| DE | 101 19 892 C2 | 11/2002 |
| EP | 1 094 204 A | 4/2001 |
| JP | 62-013720 A | 1/1987 |
| JP | 6260912 A | 3/1987 |
| JP | 2000045750 A | 2/2000 |

OTHER PUBLICATIONS

English language translation of an official action issued by German Patent Office.

* cited by examiner

*Primary Examiner*—Zelalem Eshete

(57) ABSTRACT

In an oil separator for separating oil from a fluid flow with a labyrinth-like flow guide which is formed essentially by baffle walls, at least one of the baffle walls in at least one partial area can be deformed in a manner similar to rubber.

19 Claims, 2 Drawing Sheets

OIL SEPARATOR

This application is based on and claims priority under 35 U.S.C. § 119 with respect to German Application No. 10 2004 010 583.9 filed on Mar. 2, 2004, the entire content of which is incorporated herein by reference.

FIELD OF THE INVENTION

The invention generally relates to oil separation. More particularly, the invention pertains to an oil separator for separating oil from a fluid flow with a labyrinth-like flow guide which is formed essentially by baffle walls.

BACKGROUND DISCUSSION

DE 101 19 892 C2 discloses one example of a cylinder head cover of an internal combustion engine which includes an elastomer part connected to a cover-like part of plastic. Also, DE 198 20 384 A1 discloses an oil separator with a labyrinth-like flow guide for crankcase ventilation, preferably for cylinder head covers of internal combustion engines.

SUMMARY

A cylinder head cover comprises an elastomer part connected to a plastic cover part, with the cover part also being connected to an oil separation space wall. A nozzle plate provided with openings is positioned between the cover part and the oil separation space wall, and a pair of baffle walls is positioned between the cover part and the oil separation space wall and forms a labyrinth flow guide. The baffle walls comprise a first baffle wall that is deformable and a second baffle wall.

According to another aspect, an oil separator for separating oil from a fluid flow in a separation space with a labyrinth flow guide, comprises first and second baffle walls forming the labyrinth flow guide, with at least a portion of the first baffle wall being deformable in a rubber-like manner.

BRIEF DESCRIPTION OF THE DRAWING FIGURES

The foregoing and additional features and characteristics of the disclosed embodiment will become more apparent from the following detailed description considered with reference to the accompanying drawing figures in which like elements are designated by like reference numerals.

DETAILED DESCRIPTION

Figure 1:
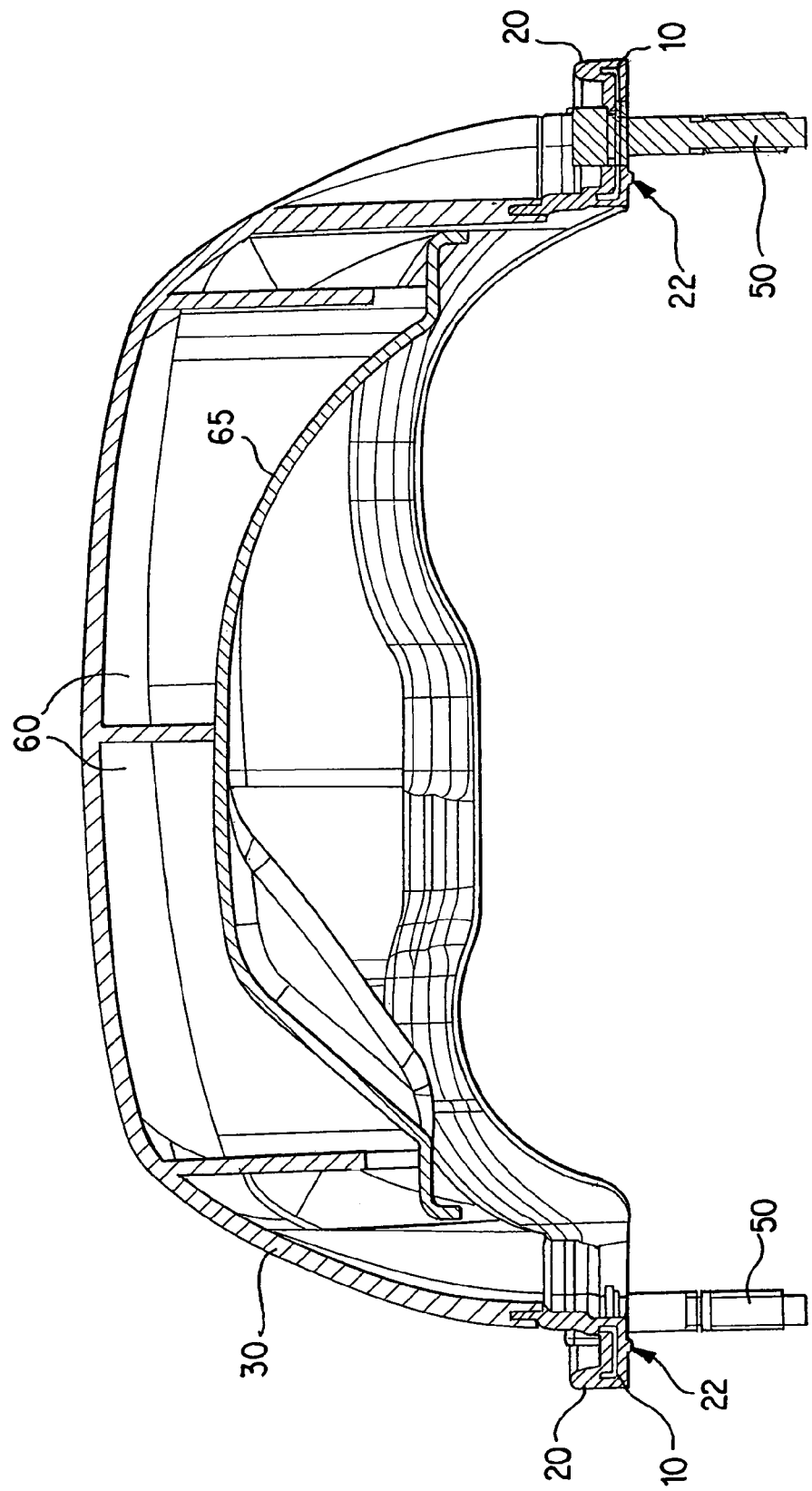
FIG. 1 is a cross-section view of a cylinder head cover with oil separation spaces.

FIG. 1 illustrates in cross-section one embodiment of the cylinder head cover. The cylinder head cover comprises an elastomer part 20 which extends or runs peripherally like a frame, with a sealing lip 22, for tightly adjoining the contact surface of an internal combustion engine. A stiffening element 10 is located in or embedded within the elastomer part 20. The stiffening element 10 likewise runs peripherally like a frame and possesses a roughly U-shaped cross-section or profile. The stiffening element 10 may be composed of several sheet metal stampings.

During manufacture, the stiffening element 10 may be coated with an adhesive, with the elastomer part 20 then being molded onto the stiffening element 10 by an injection molding process. The elastomer part 20 comprises rubber or silicone. Furthermore, the elastomer part 20 and the stiffening element 10 are provided with openings or holes through which the cylinder head cover can be attached to the contact surface via fasteners, such as the screws 50 illustrated by way of example in FIG. 1.

The cylinder head cover also comprises a cover-like part 30 of plastic adjoining the elastomer part 20. The elastomer part 20 is connected to a cover-like part 30 by virtue of the elastomer part 20 being molded into a U-shaped groove of the cover-like part 30. Oil separation spaces 60 are provided in the upper area of the cylinder head cover and are bordered to the bottom by an oil separation space wall 65 of the cylinder head cover.

Figure 2A:
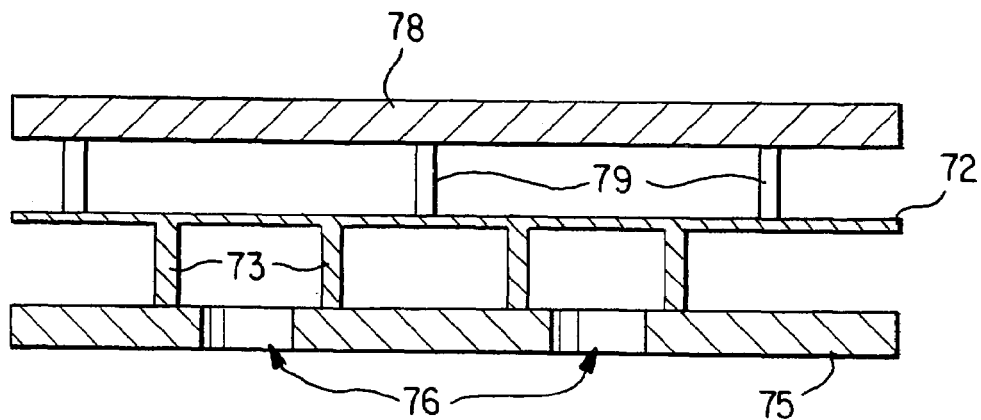
FIGS. 2a and 2b are cross-sectional enlarged views of portions of the cylinder head cover illustrating details of the oil separation space.
Figure 2B:
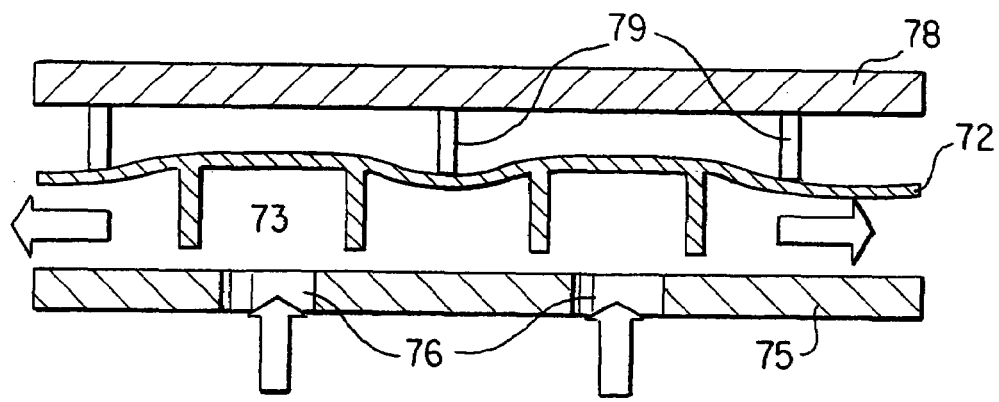

FIGS. 2a and 2b additional details associated with the oil separation spaces 60 generally depicted in FIG. 1 in highly schematically simplified illustrations. Between the cover-like part 30 and the oil separation space wall 65 which is welded to the cover-like part 30, there are parts of an oil separator. These parts comprise a nozzle plate 75 provided with openings 76 through which enters a blow-by flow containing an oil droplet. An elastically deformable baffle wall 72 of the oil separator is positioned parallel to the nozzle plate 75 and is made as an elastomer part. This deformable baffle wall 72 has projections or projecting (stalk-like) nubs 73 which are connected securely and integrally to the deformable baffle wall 72 and are produced in one piece together with the deformable baffle wall 72.

In the pressure state which does not exceed a definable value, the projections or nubs 73 support the deformable baffle wall 72 relative to the nozzle plate 75 as illustrated in FIG. 2a. On the other hand, FIG. 2b shows a condition in which the pressure state exceeds a definable value so that to maintain a constant pressure loss over the entire oil separator the deformable baffle wall 72 is deformed away from the nozzle plate 75.

The elastically deformable baffle wall 72 is also connected to another baffle wall 78 via projecting (stalk-like) connecting elements 79. In FIG. 2b, the flow conditions are illustrated by arrows. The entire oil separator is made such that a pressure loss between the entry and exit of the blow-by flow on the oil separator is kept essentially constant, for example below a maximum value of 10 mbar.

In one advantageous configuration the above described oil separation principle is combined with an oil separator which comprises a filter located for example in another of the oil separation spaces 65.

The oil separator described above is able to provide a relatively high degree of oil separation with a relatively simple structure of the oil separator. The oil separator separates oil from a fluid flow with a labyrinth-like flow guide formed essentially by baffle walls, with at least one of the baffle walls in at least one partial area being deformable (e.g., in the manner of rubber).

With a relatively simple structure of the oil separator and the associated lowered costs, a good oil separation rate of, for example, 63% may be achieved; at an oil amount of 110 mg/h at the entry point of the oil separator, corresponding to a residual oil amount of 40.7 mg/h. The distance between the baffle walls which may constitute an important characteristic of the oil separator depending on the respective fluid flow, especially blow-by flow of the internal combustion engine, can be controlled by an elastically deformable baffle wall which is comparable to an elastic membrane. Since the efficiency of the oil separator is dependent in turn on the operating point of the internal combustion engine, the deformable baffle wall results in realization of an increase in efficiency over the entire engine operating range because the distance of the baffle walls is matched substantially automatically to the respective flow velocity. Thus, even a suction relief control valve to the intake manifold of the internal combustion engine can advantageously be saved.

The principles, preferred embodiment and mode of operation have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A cylinder head cover comprising an elastomer part connected to a plastic cover part, the cover part being connected to an oil separation space wall, a nozzle plate provided with openings and positioned between the cover part and the oil separation space wall, and a pair of baffle walls positioned between the cover part and the oil separation space wall and forming a labyrinth flow guide, the baffle walls comprising a first baffle wall that is deformable and a second baffle wall, each of the openings possessing an axis that intersects the deformable first baffle wall.

2. The cylinder head cover according to claim 1, wherein the first baffle wall is deformable to adapt a distance between the first and second baffle walls.

3. The cylinder head cover according to claim 2, wherein the deformable baffle wall is made as an elastomer part.

4. The cylinder head cover according to claim 3, wherein the first baffle wall is deformable to automatically adapt the distance between the first and second baffle walls by fluid flow.

5. The cylinder head cover according to claim 4, wherein at least one projecting nub is connected securely to the deformable baffle wall and supports the deformable baffle wall when the deformable baffle wall is undeformed.

6. The cylinder head cover according to claim 5, wherein a middle area of the deformable baffle wall is connected to the second baffle wall via a projecting connecting element.

7. The cylinder head cover according to claim 1, wherein the deformable baffle wall is made as an elastomer part.

8. The cylinder head cover according to claim 1, wherein the first baffle wall is deformable to automatically adapt the distance between the first and second baffle walls by fluid flow.

9. The cylinder head cover according to claim 1, wherein at least one projecting nub is connected securely to the deformable baffle wall and supports the deformable baffle wall when the deformable baffle wall is undeformed.

10. The cylinder head cover according to claim 1, wherein a middle area of the deformable baffle wall is connected to the second baffle wall via a projecting connecting element.

11. An oil separator for separating oil from a fluid flow in a separation space with a labyrinth flow guide, comprising first and second baffle walls forming the labyrinth flow guide, with at least a portion of the first baffle wall being deformable in a manner of rubber, the first baffle wall being positioned between the second baffle wall and a nozzle plate provided with a plurality of openings, the openings possessing an axis that intersects the deformable first baffle wall.

12. The oil separator according to claim 11, wherein the deformable baffle wall is made for adapting the distance between the baffle walls.

13. The oil separator according to claim 12, wherein the deformable baffle wall is made as an elastomer part.

14. The oil separator according to claim 13, wherein the deformable baffle wall permits adaptation of the distance between the first and second baffle walls to occur automatically by the fluid flow.

15. The oil separator according to claim 14, wherein the deformable baffle wall is made such that a pressure loss between entry and exit of the fluid flow on the oil separator is kept essentially constant.

16. The oil separator according to claim 15, wherein at least one nub is connected securely to the deformable baffle wall, said nub supporting the deformable first baffle wall when the first baffle wall is essentially undeformed against the second baffle wall or a boundary of the oil separation space.

17. The oil separator according to claim 16, wherein a middle area of the deformable baffle wall is connected to one of the baffle walls or the boundary of the oil separation space via projecting connecting elements.

18. The oil separator according to claim 17, wherein the oil separator is a part of a cylinder head cover of an internal combustion engine.

19. A cylinder head cover comprising an elastomer part connected to a plastic cover part, the cover part being connected to an oil separation space wall, a nozzle plate provided with openings and positioned between the cover part and the oil separation space wall, and a pair of baffle walls positioned between the cover part and the oil separation space wall and forming a labyrinth flow guide, the baffle walls comprising a first baffle wall that is deformable and a second baffle wall,
  wherein at least the first baffle wall extends over the openings in the nozzle plate,
  each of the openings possessing an axis that intersects the deformable first baffle wall.

* * * * *